United States Patent
Kato

(10) Patent No.: US 6,598,865 B1
(45) Date of Patent: Jul. 29, 2003

(54) FLUID-FILLED VIBRATION DAMPING DEVICE

(75) Inventor: Kazuhiko Kato, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/349,587

(22) Filed: Jan. 22, 2003

(30) Foreign Application Priority Data

Jan. 29, 2002 (JP) ........................................ 2002-019956

(51) Int. Cl.$^7$ ................................................. F16F 9/00
(52) U.S. Cl. ........................... 267/140.13; 267/140.11
(58) Field of Search ................... 267/140.11, 140.13, 267/140.14

(56) References Cited

U.S. PATENT DOCUMENTS

| | | | | |
|---|---|---|---|---|
| 4,938,463 A | * | 7/1990 | Miyamoto | 267/140.13 |
| 5,209,460 A | | 5/1993 | Bouhours et al. | |
| 5,833,219 A | | 11/1998 | Mellon | |
| 6,082,717 A | | 7/2000 | Nanno | |
| 6,131,893 A | | 10/2000 | Seynaeve et al. | |
| 6,311,963 B1 | * | 11/2001 | Suzuki et al. | 267/140.13 |
| 6,311,964 B1 | * | 11/2001 | Suzuki | 267/140.13 |
| 6,386,527 B2 | * | 5/2002 | Oberle | 267/140.14 |
| 6,491,290 B2 | * | 12/2002 | Muramatsu et al. | 267/140.14 |
| 2002/0145240 A1 | * | 10/2002 | Satori et al. | 267/140.13 |

FOREIGN PATENT DOCUMENTS

| | | |
|---|---|---|
| JP | 57-9340 | 1/1982 |
| JP | 62-101979 | 5/1987 |
| JP | 10-184769 | 7/1998 |
| JP | 10-339350 | 12/1998 |

OTHER PUBLICATIONS

Eiji Tanaka, U.S. Publication No. 2002/0070489 A1, Published on Jun. 13, 2002.

* cited by examiner

Primary Examiner—Christopher P. Schwartz
(74) Attorney, Agent, or Firm—Beyer Weaver & Thomas, LLP

(57) ABSTRACT

Disclosed is a fluid-tight vibration damping device including a first and a second mounting member elastically connected with each other by an elastic body interposed therebetween, a primary fluid chamber filled with a non-compressible fluid and partially defined by the elastic body and a movable rubber plate partially defining the primary fluid chamber by one of its opposite surfaces. An engaging member is disposed to be opposed to the other surfaces of the movable rubber plate with a spacing therebetween. The engaging member is adapted to be engaged with an engaging portion integrally formed with the movable rubber plate to restrict an amount of displacement of the movable rubber plate in directions toward and away from the interior of the primary fluid chamber.

11 Claims, 5 Drawing Sheets

FLUID-FILLED VIBRATION DAMPING DEVICE

INCORPORATED BY REFERENCE

The disclosure of Japanese Patent Application No. 2002-019956 filed on Jan. 29, 2002 including the specification, drawings and abstract is incorporated herein by reference in its entirety.

BACKGROUND OF THE INVENTION

1. Field of the Invention

The present invention relates generally to a fluid-filled vibration damping device capable of exhibiting a vibration damping effect on the basis of flows of a non-compressible fluid filling a fluid chamber formed therein and suitably applicable to an engine mount for use in an automotive vehicle, for example. More particularly, the present invention is concerned with such a fluid-filled active vibration damping device including: a primary fluid chamber adapted to exhibit fluid pressure variation due to a vibrational load applied thereto; and a movable rubber plate partially defining the primary fluid chamber and adapted to be displaced toward and away from an interior of the primary fluid chamber owing to its elastic deformation for regulating or controlling the fluid pressure variation induced in the primary fluid chamber.

2. Description of the Related Art

As one type of a vibration damping device to be interposed between two members of a vibration system, there is known a fluid-filled vibration damping device capable of exhibiting a vibration damping effect with the help of flows of a non-compressible fluid filling a fluid chamber formed therein. A known example of the fluid-filled vibration damping device is disclosed in JP-A-57-9340, JP-A-62-101979 and JP-A-10-184769, wherein the fluid-filled vibration damping device includes: a rubber elastic body elastically connecting a first and a second mounting member that are disposed in mutually spaced-apart relationship with each other; a primary fluid chamber partially defined by the rubber elastic body and filled with a non-compressible fluid, while being adapted to induce fluid pressure variation due to an elastic deformation of the rubber elastic body caused by a vibrational load applied between the first and second mounting members; and a movable rubber plate partially defining the primary fluid chamber such that a peripheral portion of the movable rubber plate is bonded to and fluid-tightly supported by a rigid wall portion of the primary fluid chamber so that the fluid pressure variation induced in the primary fluid chamber is regulated or controlled by displacement of the movable rubber plate owing to its elastic deformation.

The known fluid-filled vibration damping device constructed as described above is capable of moderating or eliminating the fluid-pressure variation induced in the primary fluid chamber with the help of a slight displacement of the movable rubber plate, for improving its vibration isolating effect with respect to high and small-amplitude vibrations. Alternatively, the known fluid-filled vibration damping device can exhibit an active vibration damping effect, when being arranged such that an air chamber is formed on a rear-side of the movable rubber plate, and an air pressure in the air chamber is actively controlled so as to adjust vibration characteristics of the device depending on input vibrations by regulating a spring rigidity of the primary fluid chamber. Also, the air pressure in the air chamber is actively controlled so that the movable rubber plate is actively oscillated at a frequency corresponding to that of vibrations to be damped. For the above-described advantages, the known fluid-filled vibration damping device has been applied to engine mounts, body mounts or other damping devices for use in automotive vehicles.

In the known or conventional fluid-filled vibration damping device, as described above, the peripheral portion of the movable rubber plate is bonded to and supported by the rigid wall portion of the primary fluid chamber, thereby establishing an excellent fluid-tightness of the primary fluid chamber, while preventing a relatively large amount of displacement of the movable rubber plate in its entirety. However, the conventional fluid-filled vibration damping device may suffer from inherent problems. For instance, a durability of the movable rubber plate itself may be deteriorated due to an excessively large amount of displacement of the movable rubber plate. Further, the conventional fluid-filled vibration damping device may fail to exhibit desired damping effects on the basis of flows of the non-compressible fluid, since an effective fluid pressure variation induced in the primary fluid chamber is undesirably absorbed by the displacement of the movable rubber plate, even when the vibration damping device is subjected to low and medium frequency vibrations.

To cope with the above-described problems, a modified fluid-filled vibration damping device has been proposed, as disclosed in JP-A-57-9340 and JP-A-62-101979, in which a pair of displacement limiting plates are disposed on the opposite sides of the movable rubber plate with spacing therebetween. The displacement limiting plates have a plurality of holes formed therethrough so that a fluid pressure in the primary fluid chamber can act on the movable rubber plate through the plurality of holes. Also, the displacement limiting plates can limit an amount of displacement of the movable rubber plate such that the movable rubber plate is brought into abutting contact with one of the displacement limiting plates when the amount of displacement of the movable rubber plate increases.

The proposed fluid-filled vibration damping device, however, needs the pair of displacement limiting plates to be disposed on the both sides of the movable rubber plate, thus increasing the number of components, leading to complicated or cumbersome manufacturing operations. Further, the movable rubber plate is exposed to the primary fluid chamber through the plurality of holes formed through one of the displacement limiting plates, in other words, the fluid pressure variation induced in the primary fluid chamber is transmitted to the movable rubber plate only through the plurality of holes. This means that the displacement limiting plates possibly restrict transmission of the fluid pressure variation from the primary fluid chamber to the movable rubber plate, leading to decrease in an effective pressure receiving area of the movable rubber plate. Therefore, it is difficult for the fluid-filled vibration damping device to sufficiently improve its damping capability with the help of the elastic deformation of the movable rubber plate. Yet further, the movable rubber plate and one of the displacement limiting plates cooperate to form a slight gap in the primary fluid chamber, making it difficult to remove an air remained in the gap upon filling the primary fluid chamber with the non-compressible fluid. The air remained in the slight gap formed between the movable rubber plate and the displacement limiting plate may possibly deteriorate an intended vibration damping capability of the fluid-filled vibration damping device.

SUMMARY OF THE INVENTION

It is therefore one object of this invention to provide a novelly structured fluid-filled vibration damping device including a primary fluid chamber partially defined by a movable rubber plate, which is able to effectively restrict an amount of displacement of the movable rubber plate toward and away from an interior of the primary fluid chamber by means of a simple structure with the reduced number of components, which is easy to manufacture, and which enables a fluid pressure variation in the primary fluid chamber to effectively act on the movable rubber plate for thereby exhibiting its improved vibration damping capability with the help of elastic displacement or deformation of the movable rubber plate.

The above and/or other objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A fluid-filled vibration damping device comprising: a first mounting member and a second mounting member, which are disposed in mutually spaced-apart relationship with each other; an elastic body elastically connecting the first and second mounting member and partially defining a primary fluid chamber filled with a non-compressible fluid whose pressure varies due to an elastic deformation upon application of a vibrational load between the first and second mounting members; a movable rubber plate partially defining the primary fluid chamber such that a peripheral portion of the movable rubber plate is bonded to and fluid-tightly supported by a rigid wall portion of the primary fluid chamber so that fluid pressure variation induced in the primary fluid chamber is regulated or controlled by displacement of the movable rubber plate owing to its elastic deformation, the movable rubber plate having an engaging portion; an engaging member fixedly supported by the second mounting member such that the engaging member is disposed on one of opposite sides of the movable rubber plate with a spacing therebetween to be remote from the primary fluid chamber, and is engaged with the engaging portion of the movable rubber plate so that an amount of displacement of the movable rubber plate is restricted at least in a direction toward an interior of the primary fluid chamber.

In the fluid-filled vibration damping device constructed according to this mode of the invention, the amount of displacement of the movable rubber plate can be restricted in opposite sides of the movable rubber member by only disposing the engaging member on the one side of the movable rubber plate, which side is remote from the primary fluid chamber. Therefore, no member is needed to be disposed on the other side of the movable rubber plate, i.e., in the primary fluid chamber, in order to restrict the amount of displacement of the movable rubber plate in the direction toward the interior of the primary fluid chamber. This makes it possible to provide a mechanism for restricting the amount of displacement of the movable rubber plate with the reduced number of components and with a simple structure.

That is, no member is needed to be disposed on the other side of the movable rubber plate, which is located in the primary fluid chamber, for restricting the displacement of the movable rubber plate, making it possible to directly expose a substantially entire area of a surface of the movable rubber plate to the primary fluid chamber, thereby ensuring an improved efficiency in fluid pressure transmission from the primary fluid chamber to the movable rubber member and vice versa. Thus, the fluid-filled vibration damping device is capable of exhibiting an intended vibration damping capability owing to the elastic displacement or deformation of the movable rubber plate.

Since the member to be disposed on the other side of the movable rubber plate located in the primary fluid chamber is eliminated, no gap is formed in the primary fluid chamber by the member. Thus, the fluid-filled vibration damping device of this mode of the invention never causes a conventionally experienced problem of remaining air in the gap upon filling the primary fluid chamber with the non-compressible fluid. Namely, the fluid-filled vibration damping device of this mode of the invention permits an easy and stable filling of the primary fluid chamber with the non-compressible fluid.

In order to stably restrict the amount of displacement of the movable rubber plate, the engaging member preferably comprises a rigid member supported by the second mounting member to be fixedly disposed. The engaging portion may comprise a member made of a synthetic resin material or a metallic material, which is bonded to the movable rubber plate. Preferably, the engaging portion is formed of a rubber elastic body as an integral part of the movable rubber plate. This arrangement permits elimination or attenuation of noises or vibrations, which may occur upon interface or contact between the engaging portion and the engaging member. Further, an initial state of the engagement between the engaging portion and the engaging member may be suitably determined depending upon required damping characteristics of the fluid-filled vibration damping device. For instance, the engaging portion may be opposed to an engaging part of the engaging member with a given spacing therebetween, in order to freely permit a slight amount of displacement of the movable rubber plate. Alternatively, the engaging portion may be fixedly engaged to at least one of opposite sides of the engaging member in a direction of the displacement of the movable rubber plate. While at least one of the engaging portion of the movable rubber plate is essential to practice the present invention, a plurality of engaging portions may be formed as needed. A variety of structure may be employed for supporting and fluid-tightly bonding the peripheral portion of the movable rubber plate by and to the rigid wall portion of the primary fluid chamber. For instance, the peripheral portion of the movable rubber plate may be directly bonded to the rigid wall portion of the primary fluid chamber in the process of vulcanization of a rubber material for forming the movable rubber plate. Alternatively, the peripheral portion of the movable rubber plate may be bonded to an annular fixing member, such as a metallic ring, in the process of vulcanization of the rubber material for forming the movable rubber plate, and the annular fixing member is fixedly bonded to the rigid wall portion of the primary fluid chamber by press-fitting or the like. Still alternatively, the rigid wall portion of the primary fluid chamber may fluid-tightly grip the peripheral portion of the movable rubber plate.

The engaging portion and the engaging member may have a variety of structures in engagement therebetween, provided that the engaging portion and the engaging member is able to be mutually engaged with each other in order to restrict the amount of displacement of the movable rubber plate at least in the direction toward the interior of the primary fluid chamber. For instance, the engaging portion and the engaging member have a structure in their engagement according to the following mode (2) of the invention.

(2) A fluid-filled vibration damping device according to the above-indicated mode (1), wherein the engaging member includes an engaging bore and the movable rubber plate includes an engaging projection protruding toward and extending outward of the engaging member through the engaging bore of the engaging member with a spacing therebetween, and wherein a distal end portion of the engaging projection protruding outward of the engaging member is formed as a large diameter portion whose diameter is made larger than a diameter of the engaging bore so as to function as the engaging portion such that the large diameter portion of the engaging projection is engaged with a peripheral portion of the engaging bore in order to restrict the amount of displacement of the movable rubber plate in a direction in which the engaging projection is disengaged from the engaging bore of the engaging member.

(3) A fluid-filled vibration damping device according to the above-indicated mode (2), wherein a proximal end of the engaging projection is formed as an abutting portion whose diameter is made larger than a diameter of the engaging bore so as to function as the engaging portion such that the abutting portion of the engaging projection is engaged with the peripheral portion of the engaging bore in order to restrict the amount of displacement of the movable rubber plate in a direction in which the engaging projection is inserted into the engaging bore of the engaging member. In the fluid-filled vibration damping device of this mode of the invention, the engagement between the engaging member and the engaging portion makes it possible to provide a mechanism capable of restricting the amount of displacement of the movable rubber plate in the both directions toward and away from the primary fluid chamber, with a simple structure.

(4) A fluid-filled vibration damping device according to the above-indicated mode (2) or (3), wherein the engaging projection is formed of a rubber elastic body as an integral part of the movable rubber plate. In the fluid-filled vibration damping device of this mode of the invention, the engaging projection including the large diameter portion is formed of the rubber elastic body, thus making it possible to minimize impact noises or other unsatisfactory conditions caused upon impact between the engaging projection and the engaging member, while facilitating operation for inserting the engaging projection into the engaging bore formed through the engaging member.

(5) A fluid-filled vibration damping device according to any one of the above-indicated modes (1)–(4), wherein at least a part of a portion of the movable rubber plate, which portion is remote from the engaging portion, is located to be opposed to the engaging member with a spacing therebetween, and the movable rubber plate is brought into abutting contact with the engaging member so as to restrict the amount of displacement of the movable rubber plate in a direction away from the interior of the primary fluid chamber. The amount of displacement of the movable rubber plate in the direction away from the interior of the primary fluid chamber may be restricted by the engagement between the engaging portion and the engaging member as discussed above with respect to the mode (3) of this invention. According to this mode of the invention, the movable rubber plate is brought into abutting contact with the engaging member for restricting the amount of the displacement of the movable rubber plate in the direction away from the interior of the primary fluid chamber, instead of or in addition to the engagement between the engaging portion and the engaging member. In this mode of the invention, the movable rubber plate is brought into abutting contact with the engaging member over a relatively wide area, thereby further effectively restricting the amount of displacement of the movable rubber plate in the direction away from the primary fluid chamber. Preferably, the engaging member comprises an abutting plate portion of flat-plate shape, which is disposed to be spaced apart from the movable rubber plate on the one of opposite side of the movable rubber plate remote from the primary fluid chamber, and which is provided with a plurality of through holes. In this case, the movable rubber plate is brought into abutting contact with a portion of the abutting plate portion of the engaging member where no through hole is provided, thereby restricting the amount of displacement of the movable rubber plate in the direction away from the interior of the primary fluid chamber.

(6) A fluid-filled vibration damping device according to any one of the above-indicated modes (1)–(5), wherein one of opposite major surfaces of the movable rubber plate which is remote from the primary fluid chamber, is exposed to an atmosphere, and the engaging member is disposed in the atmosphere. In the fluid-filled vibration damping device according to this mode of the invention, the engaging member is disposed in an area in which no non-compressible fluid is filled, thus eliminating the conventionally experienced problem of the remaining air in the gap formed between the movable rubber plate and the engaging member in the primary fluid chamber.

The principle of the present invention as applied to the fluid-filled vibration damping device constructed according to any one of the above-indicated modes (1)–(6) may be similarly applicable to various kinds of fluid-filled vibration damping devices as disclosed in JP-A-57-9340, JP-A-62-101979 and JP-A-10-184769. For instance, the above-described principle of the present invention may be applicable to a fluid-filled vibration damping device as disclosed in JP-A-57-9340 according to the following mode (7) of the present invention.

(7) A fluid-filled vibration damping device according to any one of the above-indicated modes (1)–(6), further comprising a flexible layer disposed on the one of opposite sides of the movable rubber plate which is remote from the primary fluid chamber so as to form an equilibrium chamber filled with the non-compressible fluid and whose volume is variable due to elastic displacement or deformation of the flexible layer, wherein one of opposite major surfaces of the movable rubber plate which is remote from the primary fluid chamber, is exposed to the equilibrium chamber, while an orifice passage is formed for permitting a fluid communication between the primary fluid chamber and the equilibrium chamber.

Similarly, the principle of the present invention as applied to the fluid-filled vibration damping device constructed according to any one of the above-indicated modes (1)–(6) may be similarly applicable to the fluid-filled vibration damping devices as disclosed in JP-A-62-101979, for example, according to the following mode (8) of the invention.

(8) A fluid-filled vibration damping device according to any one of the above-indicated modes (1)–(6), wherein the second mounting member is formed to have a generally cup shape in its entirety and is opposed at an open end portion thereof to the first mounting member with a spacing therebetween, and the elastic body is interposed between and elastically connecting the first and second mounting members such that the open end portion of the second mounting member is fluid-tightly closed by the elastic body for forming the primary fluid chamber within the second mounting member, the fluid-filled vibration damping device further comprising: a flexible layer in the form of a thin annular layer disposed outward of the elastic body with a spacing therebetween such that an inner peripheral portion of the flexible layer is bonded to the first mounting member while an outer peripheral portion of the flexible layer is bonded to the open end portion of the second mounting member, for forming an equilibrium chamber partially defined by the flexible layer, filled with the non-compressible fluid and disposed on one of opposite sides of the elastic body which is remote from the primary fluid chamber; and an orifice passage is also formed for permitting a fluid communication between the primary fluid chamber and the equilibrium chamber. This arrangement makes it possible to expose the one of opposite surfaces of the movable rubber plate which is remote from the primary fluid chamber to the atmosphere in the fluid-filled vibration damping device incorporating the primary fluid chamber and the equilibrium chamber which are held in fluid communication with each other through the orifice passage, thus eliminating the conventionally experienced problem that the vibration damping characteristics of the fluid-filled vibration damping device is adversely influenced by the air remained in the gap formed between the movable rubber plate and the engaging member in the process of filling the primary fluid chamber with the non-compressible fluid.

Also, the principle of the present invention as applied to the fluid-filled vibration damping device constructed according to any one of the above-indicated modes (1)–(6) may be similarly applicable to the fluid-filled vibration damping device as disclosed in JP-A-10-184769 according to the following mode (9) of the invention.

(9) A fluid-filled vibration damping device according to any one of the above-indicated modes (1)–(6), further comprising a fluid-tightly closed working air chamber disposed on the one of opposite sides of the movable rubber plate which is remote from the primary fluid chamber and partially defined by the movable rubber plate; and an air passageway for permitting an application of air pressure variation from an exterior area to the working air chamber. The fluid-filled vibration damping device of this mode of the invention installed in position is capable of exhibiting an active vibration damping effect by changing the air pressure variation applied to the working air chamber depending upon vibrations to be damped for adjusting wall spring stiffness of the primary fluid chamber, or alternatively is capable of exhibiting an active vibration damping effect by applying the air pressure variation having a frequency corresponding to that of vibrations to be damped to the working air chamber.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
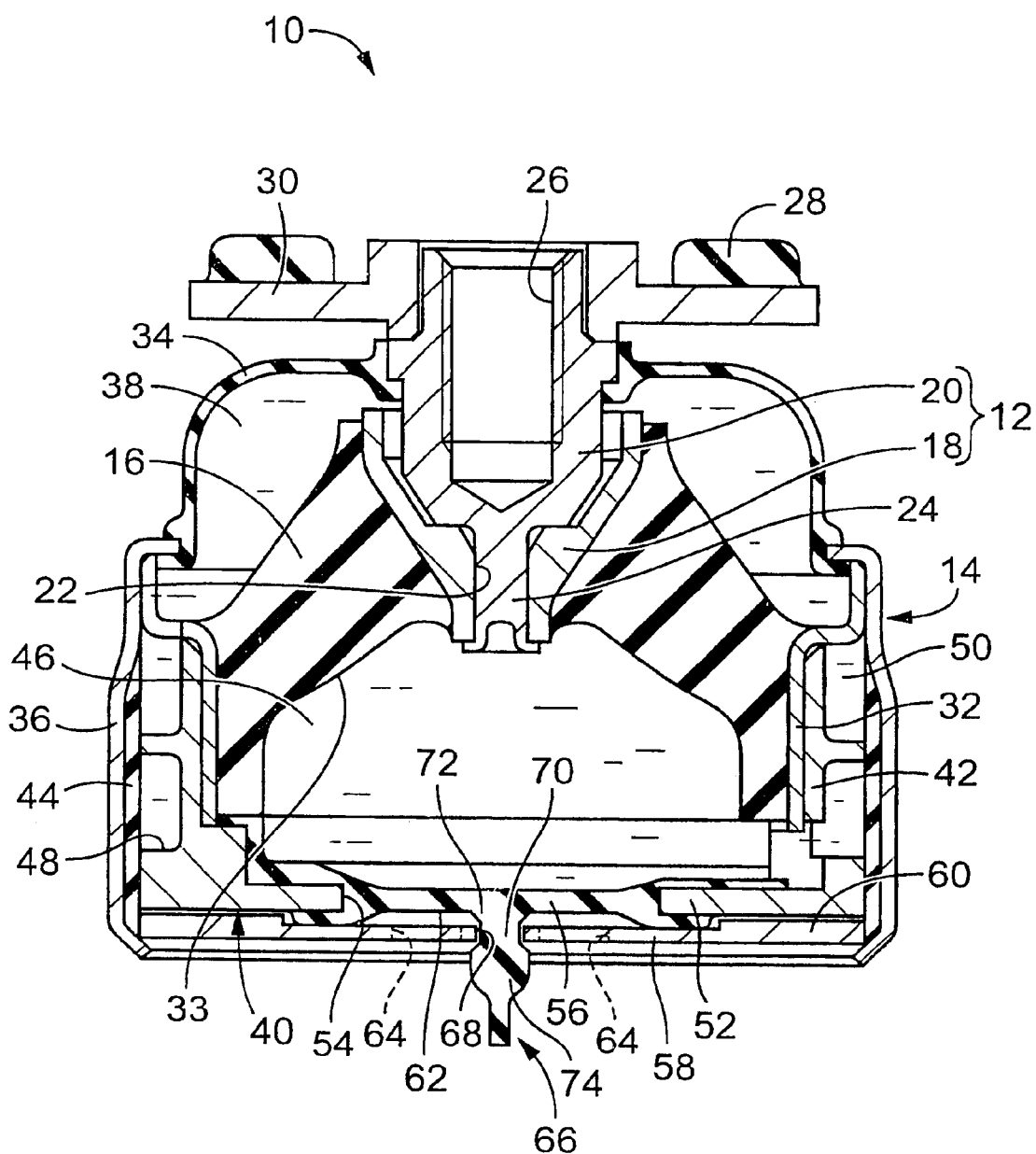
FIG. 1 is an elevational view in axial or vertical cross section of a fluid-filled vibration damping device in the form of an engine mount constructed according to a first embodiment of the present invention.
Figure 2:
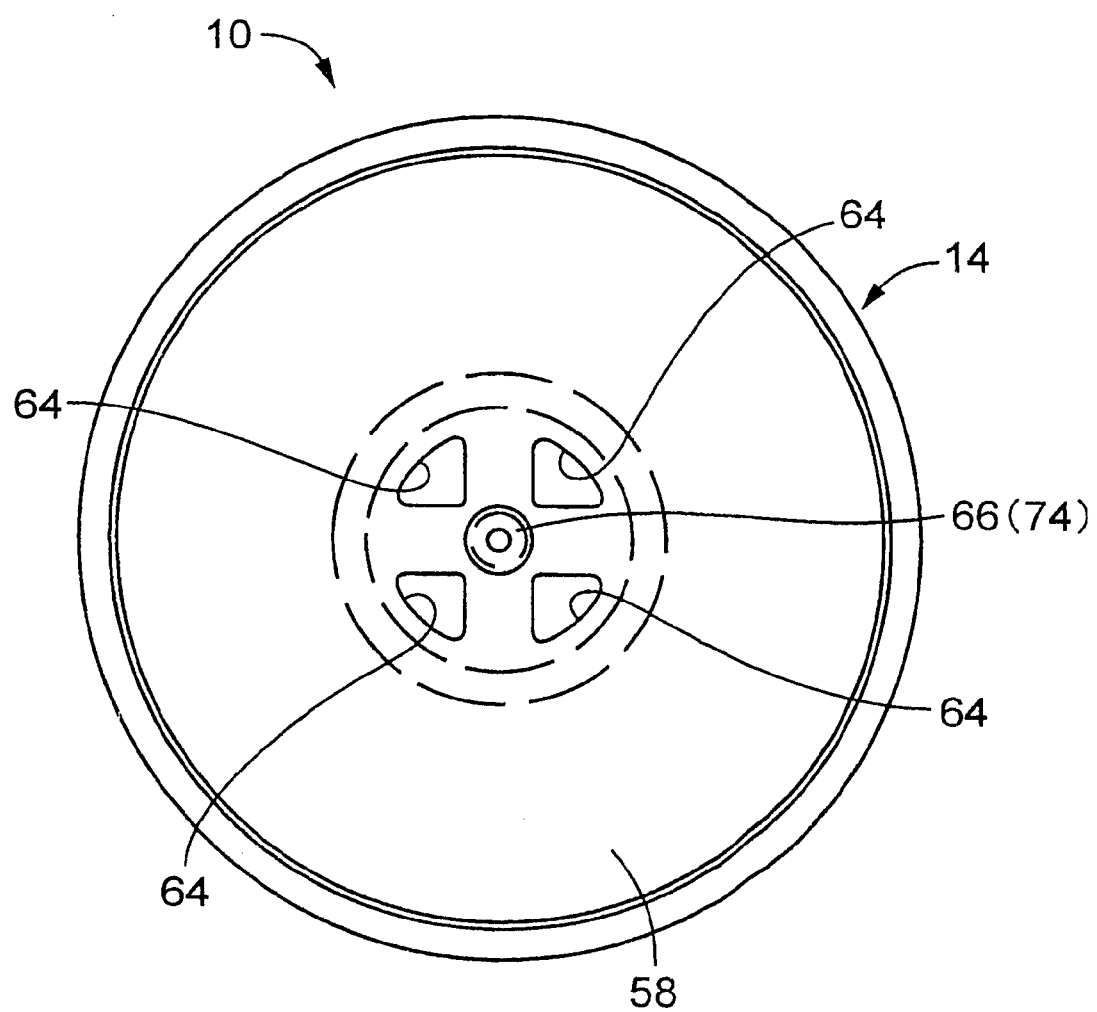
FIG. 2 is a bottom plane view of the engine mount of FIG. 1.

Referring first to FIGS. 1 and 2, an engine mount 10 for use in an automotive vehicle is shown as a first embodiment of a fluid-filled vibration damping device of the present invention. The engine mount 10 includes a first mounting member 12 and a second mounting member 14, which are both made of metal and in a mutually spaced-apart relationship with each other, and an elastic body 16 elastically connecting these first and second mounting members 12, 14 with each other. The first mounting member 12 is adapted to be fixed to a member on the side of a power unit of the vehicle, while the second mounting member 14 is adapted to be fixed to a member on the side of a body of the vehicle, so that the engine mount 10 is able to elastically mount the power unit on the body of the vehicle in a vibration damping fashion. Since the engine mount 10 is installed on the vehicle with its central axis extending in the vertical direction as seen in FIG. 1 that is substantially parallel to the vertical direction, there will be described in detail the engine mount 10 in this orientation, basically.

More specifically, the first mounting member 12 includes an inverted tapered-cylindrical outer mounting member 18 and a generally rod-shaped inner mounting member 20. The outer mounting member 18 has a fixing bore 22 extending along its central axis, while the inner mounting member 20 has a fixing rod 24 integrally formed so as to extend downwardly along its central axis which extends axially downwardly. The fixing rod 24 is inserted through the fixing bore 22, and is caulked against at its lower end portion to the outer mounting member 18 so that the outer mounting member 18 and the inner mounting member 20 are firmly assembled and fixed to each other to be formed as an integral body. While the outer mounting member 18 and the inner mounting member 20 are fixed together with a fluid-tight sealing between their fixing surfaces, a sealing rubber layer may be provided between their fixing surfaces, as needed. The inner mounting member 20 also has a tapped hole 26 extending along its center axis and open in its axially upper end face. A bolt (not shown) is screwed into the tapped hole 26, so that the first mounting member 12 is firmly fixed to the power unit of the vehicle (not shown). Further, a metallic stopper 30 is press-fitted onto an upper end portion of the inner mounting member 20 with a rubber buffer 28 secured to its upper end face. According to this arrangement, when a relatively large vibrational load is applied between the first and second mounting members 12, 14, the stopper 30 is brought into abutting contact with an abutting member (not shown) via the rubber buffer 28, thereby restricting an amount of displacement of the first and second mounting members 12, 14 relative to each other in a rebound direction, i.e., a direction in which the first and second mounting member 12, 14 are spaced away from each other in their axial direction.

To the outer mounting member 18 of the first mounting member 12 an elastic body 16 is bonded in the process of vulcanization of a rubber material for forming the elastic body 16. More specifically, the elastic body 16 has an approximately frusto-conical shape in its entirety, and is bonded to the outer mounting member 18 at its small-diameter end portion such that the outer mounting member 18 extends through a central portion of the elastic body 16 in the axial direction of the elastic body 16. The elastic body 16 is also bonded to a metallic outer sleeve 32 at an outer circumferential surface of its large-diameter end portion in the above-described process of vulcanization. Thus, the elastic body 16 and the outer and inner mounting members 18, 20 are formed as an integral vulcanized assembly. The elastic body 16 further has a large-diameter recess 33 open in its large-diameter end face.

A flexible layer in the form of a flexible rubber layer 34 is assembled with the first mounting member 20 such that the flexible rubber layer 34 is disposed above and covers an upper outer surface of the elastic body 16. The flexible rubber layer 34 is made of an easily deformable thin-rubber layer, which has a generally annular-disk overall shape provided with a sufficient slack for flexibility. The flexible rubber layer 34 is fixed at its inner peripheral portion to an outer circumferential surface of the inner mounting member 20 of first mounting member 12, and fixed at its outer peripheral portion to an outer sleeve 36 in the process of vulcanization of a rubber material for forming the flexible rubber layer 34. The outer sleeve 36 is a cylindrical member whose diameter and axial length are made larger than those of the outer circumferential sleeve 32 bonded to the elastic body 16 and the flexible rubber layer 34 is bonded to a peripheral portion of the upper open end of the outer sleeve 36 upon vulcanization of the rubber material for forming the flexible rubber layer 34.

With an axially upper end portion of the outer circumferential sleeve 32 being press-fitted into an axially upper end portion of the outer sleeve 36, the elastic body 16 and the flexible rubber layer 34 cooperate to form therebetween an equilibrium chamber 38. The equilibrium chamber 38 is partially defined by the flexible rubber layer 34 and surrounds the first mounting member 12 with an annular shape, so that a volume of the equilibrium chamber 38 is variable due to the deformation of the flexible rubber layer 34. This arrangement permits the equilibrium chamber 38 to promptly absorb a fluid pressure variation induced therein.

An axially lower end portion of the outer sleeve 36 protrudes axially downward of an axially lower end portion of the outer circumferential sleeve 32 for receiving a bottom covering member 40 inserted into the outer sleeve 36 therefrom, this bottom covering member 40 is firmly fixed to an axially lower open end portion of the outer sleeve 36 by means of drawing, caulking or other possible processing operations. The bottom covering member 40 is made of a rigid material such as metal, and has approximately cylindrical cup shape in its entirety. An outer circumferential wall 42 of the bottom covering member 40 is fixedly fitted in between the outer circumferential sleeve 32 and the outer sleeve 36 in a radial direction of the engine mount 10, so that axially lower open end portions of the outer circumferential sleeve 32 and the outer sleeve 36 are fluid-tightly closed by the bottom covering member 40. In this respect, a thin sealing rubber layer 44 bonded to an inner circumferential surface of the outer sleeve 36 is compressed by and between the outer circumferential wall 42 and the inner circumferential surface of the outer sleeve 36 for ensuring a fluid-tightly sealing therebetween.

As a result, the recess 33 of the elastic body 16 is fluid-tightly closed by the bottom covering member 40, thereby defining a pressure-receiving chamber 46 between the elastic body 16 and the bottom covering member 40.

That is, the pressure-receiving chamber 46 is partially defined by the elastic body 16, and causes fluid-pressure variation therein upon application of vibrational load between the first and second mounting members 12, 14 due to the elastic deformation of the elastic body 16. As is apparent from the aforesaid description, the pressure-receiving chamber 46 functions as a primary fluid chamber in the present embodiment. It is also noted that the outer circumferential sleeve 32, the outer sleeve 36 and the bottom covering member 40, which are mutually and integrally fixed together, cooperate with each other to form the rigid second mounting member 14 which has a generally cylindrical deep cup shape in its entirety. The second mounting member 14 thus constructed is adapted to be fixed to the body of the vehicle via a cylindrical bracket (not shown) fitted onto the outer sleeve 36.

The outer circumferential wall 42 of the bottom covering member 40 has a circumferential groove 48 extending in its circumferential direction with a given length and open in its outer circumferential surface. One of opposite ends of the circumferential groove 48 is open to and held in communication with the pressure-receiving chamber 46 and the other end is open to and held in communication with the equilibrium chamber 38. Thus, the circumferential groove 48 provides an orifice passage 50 for connecting and permitting a fluid communication between the pressure-receiving chamber 46 and the equilibrium chamber 38.

The pressure-receiving chamber 46, equilibrium chamber 38 and orifice passage 50 constitute a fluid-tightly closed area shut from the external area as described above. This fluid-tightly closed area is filled with a non-compressible fluid. The non-compressible fluid may be selected among from water, alkylene glycol, polyalkylene glycol, silicon oil and the like. A low-viscosity fluid which has a viscosity not higher than 0.1 Pa·s is preferably selected.

The thus constructed engine mount 10 is installed between the body and power unit of the vehicle in a vibration-damping fashion in which the first mounting member 12 is fixed to a member of the side of the power unit, while the second mounting member 14 is fixed to a member of the side of the body. Upon application a vibrational load between the first and second mounting members 12, 14 in an axial direction of the engine mount 10 (the vertical direction of FIG. 1.), a fluid pressure variation is induced in the pressure-receiving chamber 46 and the equilibrium chamber 38, which causes a flow of the fluid between the pressure-receiving chamber 46 and the equilibrium chamber 38 through the orifice passage 50. Therefore, the engine mount 10 is able to exhibit an excellent vibration-damping capability on the basis of resonance or flows of the fluid through the orifice passage 50. In the present embodiment of the invention, the orifice passage 50 is tuned such that the engine mount 10 can exhibit excellent vibration-damping and isolating effects with respect to low-frequency and large-amplitude vibrations such as engine shakes, and medium-frequency and medium-amplitude vibrations such as engine idling vibrations, on the basis of resonance or flows of the fluid through the orifice passage 50.

The bottom covering member 40 partially defining the pressure-receiving chamber 46 includes a large-diameter through hole 54 formed through a central portion of a bottom portion 52 thereof and a movable rubber plate 56 disposed in the large-diameter through hole 54. The movable rubber plate 56 of overall disk shape extends in a radial direction perpendicular to the axis of the engine mount 10 with an approximately constant thickness, and is bonded at its peripheral portion to a peripheral portion of the large-diameter through hole 54 in the process of vulcanization of a rubber material for forming the movable rubber plate 56 so that the movable rubber plate 56 expands over an entire area of the through hole 54 with no slack. Thus, the through hole 54 is fluid-tightly closed by the movable rubber plate 56 such that the pressure-receiving chamber 46 is partially defined by the movable rubber plate 56.

An engaging member in the form of an engaging plate 58 is disposed axially outward of the bottom portion 52 of the bottom covering member 40. The engaging plate 58 is rigid, metallic and of thin disk shape in its entirety, and is superposed on a lower or outer end face of the bottom portion 52, with its outer peripheral portion caulked against to the axially lower open end portion of the outer sleeve 36 together with the bottom covering member 40. Meanwhile, the thickness of the engaging plate 58 is made larger at a peripheral portion thereof than at a central portion as an abutting plate portion over an entire circumferential length thereof so as to provide an annular projection 60 integrally formed at the peripheral portion of the engaging plate 58 to protrude toward the bottom covering member 40. In addition, a peripheral portion of the movable rubber plate 56, which is bonded in the aforesaid vulcanization process to the peripheral portion of the through hole 54, extends radially outwardly to thereby provide an annular portion protruding axially outward of the bottom portion 52. The central portion of the engaging plate 58 is held in contact with this annular portion of the movable rubber plate 56, so that the engaging plate 58 is opposed to an outer surface 62 of the movable rubber plate 56 with a slight space therebetween.

The engaging plate 58 is also provided with four through holes 64 formed through its central portion located to be opposed to the movable rubber plate 56, and arranged about its center axis at regular intervals. Since the through holes 64 extend through the engaging plate 58 in a thickness direction of the engaging plate 58, the movable rubber plate 56 is exposed to the atmosphere through the through holes 64 so that the movable rubber plate 56 is permitted to displace toward and away from the interior of the pressure-receiving chamber 46 due to an elastic deformation of the movable rubber plate 56. The engaging plate 58 is further formed with an engaging bore 68 extending therethrough in its thickness direction along its central axis with a circular shape in radial cross section.

The movable rubber plate 56 has an engaging portion in the form of an engaging projection 66 integrally formed on its central portion so as to protrude toward the engaging plate 58 along its center axis. The engaging projection 66 has circular shape in radial cross section and a diameter which changes in its axial direction so as to form a small-diameter narrow portion 70 at its axially intermediate portion in the axial direction. One of opposite sides of the narrow portion 70, i.e., a proximal end portion of the engaging projection 66 provides an abutting portion in the form of a large-diameter portion 72 in which a diameter increases from the narrow portion 70 toward the movable rubber plate 56, while the other side of the narrow portion 70, i.e., a protruding end portion of the engaging projection 66 provides an engaging portion 74 as a large diameter portion, whose diameter is made large to be approximately equal to the largest diameter of the large-diameter portion 72.

The engaging projection 66 extends through the engaging bore 68 so as to protrude axially outwardly from the engaging plate 58. The engaging projection 66 is disposed relative to the engaging bore 68 such that the narrow portion 70 is positioned in the engaging bore 68 and the large-diameter portion 72 and engaging portion 74 are positioned on axially inner and outer sides of the engaging bore 68 of the engaging plate 58. In this regards, the engaging bore 68 is arranged to have a diameter larger than that of the narrow portion 70 and smaller than the largest diameters of the large-diameter portion 72 and engaging portion 74. In the present mode of the invention, while the engaging projection 66 has a small-diameter portion arranged to have a diameter is smaller than that of the engaging bore 68 for providing the narrow portion 72 extending through the engaging bore 68 this small-diameter portion of the engaging projection is also arranged to have an axial length slightly larger than that of the engaging bore 68.

The thus formed movable rubber plate 56 provided with the engaging projection 66 gives the following advantages to the engine mount 10, for example. Namely, when the engine mount 10 installed in position of the vehicle as described above is subjected to a vibrational load applied between the first and second mounting members 12 and 14, the fluid pressure varies in the pressure-receiving chamber 46 due to the elastic deformation of the elastic body 16. This fluid-pressure variation causes the movable rubber plate 56 to elastically displace toward and away from the interior of the pressure-receiving chamber 46, whereby the central portion of the movable rubber plate 56 is substantially displaced in the described directions. As a result, resistance to flows of the fluid through the orifice passage 50 considerably increases upon application to the engine mount 10 a high-frequency vibration whose frequency is higher than that of a vibration to which the orifice passage 50 is tuned, more specifically, a vibration with a high frequency and small amplitude such as a booming noise, for example. Therefore, a relatively large fluid pressure variation induced in the pressure-receiving chamber 46 is moderated or absorbed, whereby the engine mount 10 can avoid remarkable increase in its dynamic spring constant and a resultant deterioration in its vibration-damping capability in a high-frequency range of input vibrations.

It should be appreciated that the engaging projection 66 integrally formed with the movable rubber plate 56 extends through the engaging bore 68 of the engaging plate 58 fixed to the second mounting member 14 with a given spacing therebetween both in the axial and radial directions. This arrangement permits the movable rubber plate 56 to be displaced independently of the engaging plate 58 while being rarely limited by the provision of the engaging projection 66 and the engaging plate 58 in a state where the movable rubber plate 56 is forced to displace by a slight amount. In a state where the movable rubber plate 56 is forced to displace by a relatively large amount, on the other hand, the large-diameter portion 72 and the engaging portion 74 are brought into abutting contact with the engaging plate 58, thus limiting an amount of displacement of the movable rubber plate 56 by the engaging plate 58 in a cushioning fashion.

Therefore, the engine mount 10 constructed according to the present embodiment can enjoy improved vibration-damping characteristics upon application of booming noises or other high-frequency and small-amplitude vibrations between the first and second mounting members 12 and 14, since the movable rubber plate 56 is forced to freely displace as described above, in order to give a low dynamic spring constant to the engine mount. On the other hand, upon application of vibrations having a frequency to which the orifice passage 50 is tuned, namely, low-frequency and large-amplitude vibrations such as engine shakes or medium-frequency and medium-amplitude vibrations such as engine idling, an amount of displacement of the movable rubber member 56 and a resultant pressure-absorbing effect of the pressure-receiving chamber 46 are suitably limited as a result of an abutting contact between the engaging plate 58 and the engaging projection 66, thereby effectively inducing a relatively large fluid pressure variation in the pressure-receiving chamber 46. This accordingly induces a fluid pressure difference between the pressure-receiving and equilibrium chambers 46, 38, thereby effectively permitting a suitable amount of fluid flows through the orifice passage 50 between the pressure-receiving and equilibrium chambers 46, 38. Therefore, the engine mount 10 can exhibit an excellent vibration-damping effect on the basis of resonance or flows of the fluid through the orifice passage 50.

According to the present embodiment, the above-described mechanism for limiting the amount of displacement of the movable rubber plate 56 can be embodied by the engaging projection 66 integrally formed with the movable rubber plate 56 and the engaging plate 58 disposed on one of sides of the movable rubber plate 56 remote from the pressure receiving chamber 46. In addition, this mechanism is capable of limiting the amount of displacement of the movable rubber plate 56 in both directions toward and away from the interior of the pressure-receiving chamber 46. That is, this mechanism is simple in construction with reduced number of components and is easy to manufacture, in comparison with those disclosed in JP-A-57-9340 and JP-A-62-101979.

Since the engaging plate 58 is disposed on one side of the movable rubber plate 56 exposed to the atmosphere and remote from the pressure-receiving chamber 46, the provision of the mechanism for limiting the amount of displacement of the movable rubber plate 56 never forms a small or slight gap or the like in the pressure-receiving chamber 46. Thus, the engine mount 10 can eliminate the conventionally experienced problem that an air remained in the small gap deteriorate vibration-damping characteristics of the engine mount 10. The filling of the pressure-receiving chamber 46 and the equilibrium chamber 38 with the non-compressible fluid may desirably be accomplished at the same time when these chambers 46, 38 are formed as follows, for example. The integral vulcanized product of the elastic body 16 is assembled with the integral vulcanized product of the flexible rubber layer 34 in the atmosphere. The thus obtained assembly is immersed in a mass of the fluid and is further assembled with the bottom covering member 40 and the engaging plate. Finally, the outer sleeve 36 is subjected to a suitable operation to be drawn within the non-compressible fluid. Thus, the filling of the pressure-receiving and equilibrium chambers 46, 38 and the forming of these chambers can be accomplished simultaneously.

Further, no member covering the movable rubber plate 56 is disposed on the other side of the movable rubber plate 56 located in the pressure-receiving chamber 46 for limiting the amount of displacement of the movable rubber plate 56, so that an inner surface of the movable rubber plate 56 (i.e., a surface defining the pressure-receiving chamber 46) is directly exposed to the pressure-receiving chamber 46 over its entire area. In this arrangement, fluid pressure variation induced in the pressure-receiving chamber 46 can act on the entire area of the inner surface of the movable rubber plate 56. Therefore the movable rubber plate 56 is so sensitive to the fluid pressure variation in the pressure-receiving chamber 46 enough to effectively moderate the fluid pressure variation in the pressure-receiving chamber 46 by its displacement upon application of a high-frequency vibration to the engine mount 10.

Yet further, the engaging projection 66, which cooperates with the engaging plate 58 in order to limit the amount of displacement of the movable rubber plate 56, is integrally formed with the movable rubber plate 56. This further simplifying the structure of the mechanism, and facilitating manufacture of the mechanism. In addition, since the engaging projection 66 itself is formed of a rubber elastic body, noises caused upon impact or collision of the engaging projection 66 against the engaging plate 58 for limiting the amount of displacement of the movable rubber plate 56 are effectively prevented.

In addition, the engaging projection 66 has the large-diameter portion 72 at its proximal end portion, located on the axially upper side of the narrow portion 70 disposed in the engaging bore 68 of the engaging plate 58. This arrangement permits the engaging projection 66 and engaging plate 58 to similarly limit the amount of displacement of the movable rubber plate 56 in the direction away from the interior of the pressure-receiving chamber 46 (or an outward direction of the pressure-receiving chamber 46) as well as in the direction toward the interior of the pressure-receiving chamber 46 (or an inward direction of the pressure-receiving chamber 46). That is, the mechanism for limiting the displacement of the movable rubber plate 56 in the inward and outward directions of the pressure-receiving chamber 46 can be provided with a considerably simple structure.

The movable rubber plate 56 is opposed to the engaging plate 58 at a portion where the engaging projection 66 is not formed as well. This portion is forced to come into abutting contact with the engaging plate 58 for limiting an excess amount of displacement of the movable rubber plate 56 in the outward direction of the pressure-receiving chamber 46.

Figure 3:
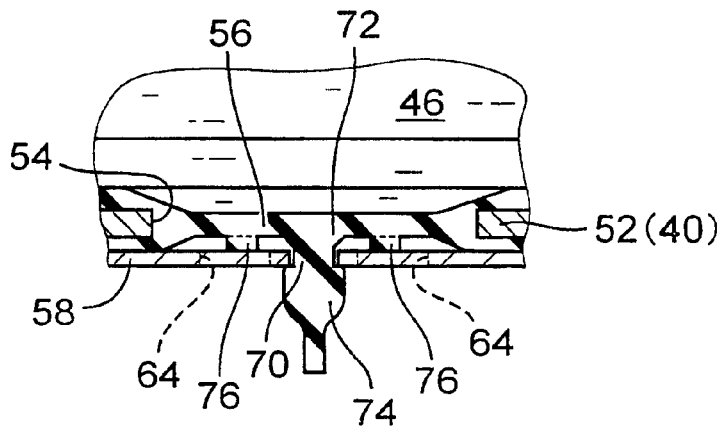
FIG. 3 is a fragmental view in an axial or vertical cross section of an example of a mechanism of restriction of a displacement amount of a movable rubber plate employable in the engine mount of FIG. 1.
Figure 4:
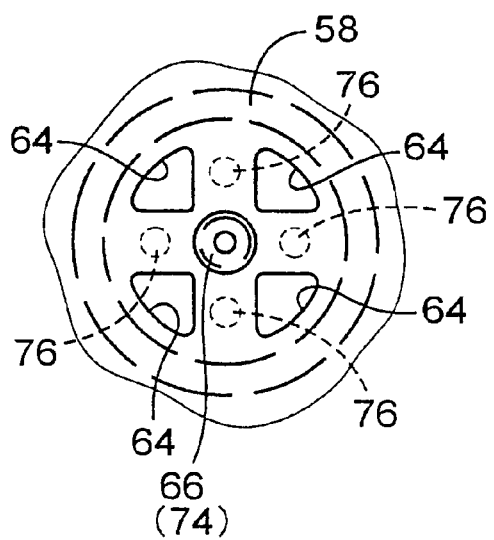
FIG. 4 is a bottom plane view corresponding to FIG. 3.

It is possible to further utilize the above-described mechanism for limiting the amount of displacement of the movable rubber plate 56 on the basis of an abutting contact of the engaging projection 66 with the engaging plate 58. As shown in FIGS. 3 and 4 by way of example, the movable rubber plate 56 is further provided with integrally formed abutting projections 76 which protrudes from the axially lower end face of the movable rubber plate 56 toward the engaging plate 58. The provision of the abutting projections 76 makes it possible to adjust a stroke of the displacement of the movable rubber plate 56 required to come into contact with the engaging plate 58, or alternatively to moderate impact upon abutting contact of the movable rubber plate 56 against the engaging plate 58.

It is also possible to suitably arrange the mechanism for limiting the amount of displacement of the movable rubber plate 56 by means of an engagement or an abutting contact of the engaging projection 66 of the movable rubber plate 56 with the engaging plate 58. In other words, an effect acting on the movable rubber plate for limiting an amount of displacement thereof may be suitably adjusted according to the following manners, for example. As shown in FIGS. 3 and 4, the large-diameter portion 72 and the engaging portion 74 may be regulated in terms of angles of their tapered abutting surfaces, which are brought into abutting contact with the engaging plate 58. Alternatively or in addition to that, the engaging bore 68 through which the engaging projection 66 extends, may be arranged in terms of its diameter so as to adjust or eliminate a gap distance between the bore 68 and projection 66.

There will be described a second and a third embodiment of a fluid-filled vibration damping device of the present invention. The second and third embodiments relate to engine mounts with basic structures respectively different from that of the engine mount 10 according to the first embodiment, to which the above-described limiting mechanism including the engaging projection 66 and the engaging plate 58 for limiting the amount of displacement of the movable rubber plate 56 are applied, respectively. Hereinafter the referenced limiting mechanism is referred to as the "displacement limiting mechanism" where appropriate. Since these engine mounts according to the second and third embodiments are basically identical in their the displacement limiting mechanisms, the same reference numerals as used to identify the component of the displacement limiting mechanisms in the first embodiment are used to designate the corresponding elements and parts of the displacement limiting mechanisms in the following embodiments, and the redundant description thereof is omitted.

Figure 5:
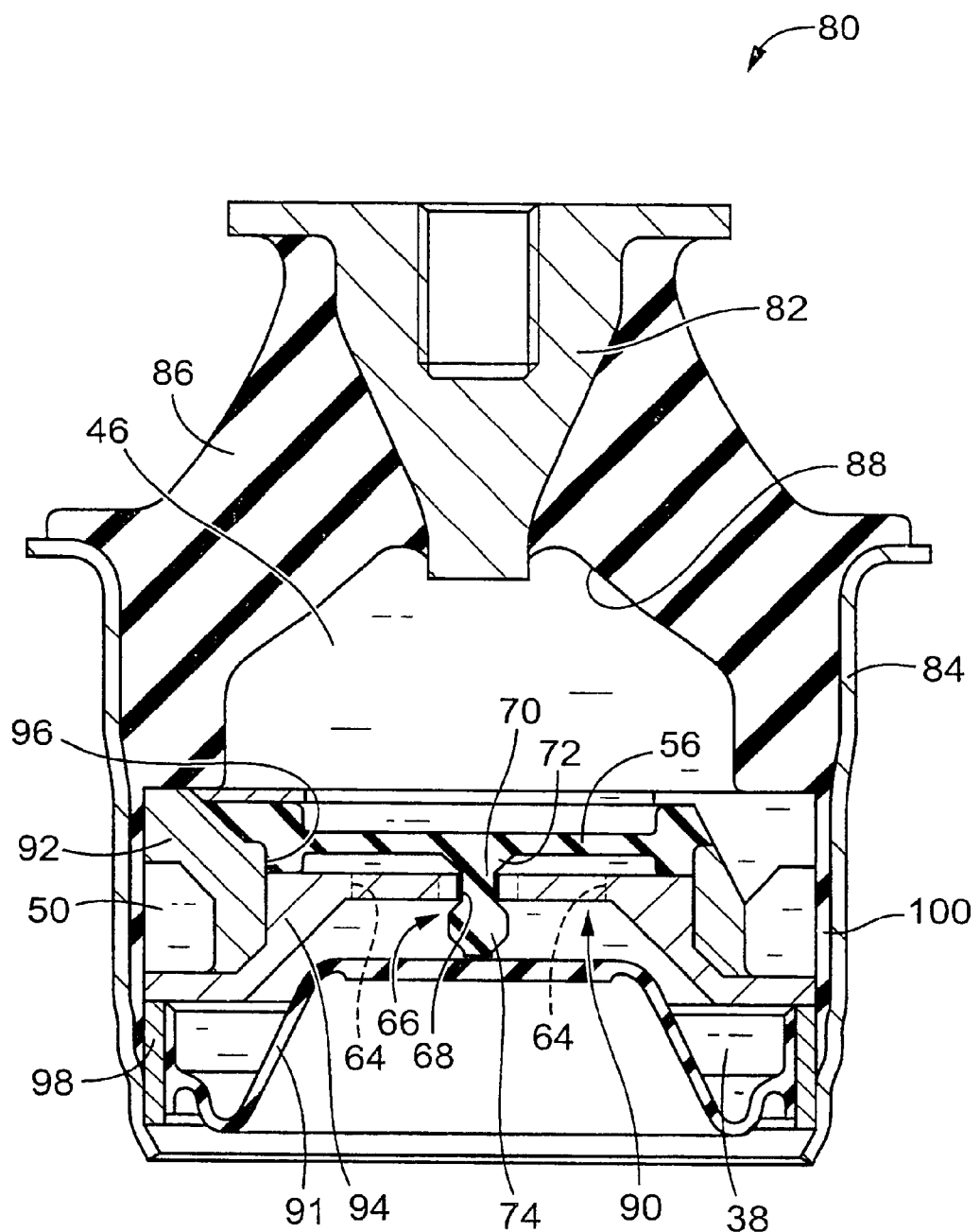
FIG. 5 is an elevational view in axial or vertical cross section of an engine mount constructed according to a second embodiment of the present invention.

Referring next to FIG. 5, shown is a fluid-filled vibration damping device for use in automotive vehicles in the form of an engine mount 80 according to the second embodiment of the present invention. Like the engine mount 10, the engine mount 80 includes a first mounting member 82 and second mounting member 84 which are both made of metal and in a mutually spaced-apart relationship with each other and an elastic body 86 interposed between and elastically connecting the first and second mounting members 82, 84 with each other. The engine mount 80 is adapted to be interposed between a body and a power unit of the vehicle for elastically supporting the power unit on the body in a vibration-damping fashion. With the engine mount 80 installed on the vehicle as described above, a static load or weight of the power unit and a primary vibrational load act between the first and second mounting members 82, 84 in an approximately axial direction of the engine mount 80 (the vertical direction of FIG. 1).

More specifically, the first mounting member 82 has an inverted frusto-conical block shape, while the second mounting member 84 has a large-diameter cylindrical shape. The first mounting member 82 is disposed to be opposed to an axially upper open end portion of the second mounting member 84 with a spacing therebetween. The elastic body 86 has a generally frusto-conical shape in its entirety, and is bonded to the first mounting member 82 in the process of vulcanization a rubber material for forming the elastic body 86, such that the first mounting member 82 extends through a central portion of the elastic body 86 along a center axis of the elastic body 86. On the other hand, the elastic body 86 is bonded at its an outer circumferential surface of its large-diameter end portion to an inner circumferential surface of the axially upper open end portion of the second mounting member 84 in the above-described vulcanization process. Accordingly, the axially upper open end portion of the second mounting member 84 is fluid-tightly closed by the elastic body 86. The elastic body 86 further includes a large-diameter recess 88 open in its large-diameter end face.

The second mounting member 84 accommodates a partition member 90 and a flexible layer in the form of a diaphragm 91 disposed in its interior space. The partition member 90 consists of a disk-shaped lower partition member 94 and an annular-plate-shaped upper partition member 92 which are made of rigid material such as metal and synthetic resin, and superposed on each other in the vertical direction. The lower and upper partition members 94, 92 cooperated with each other to form therebetween an orifice passage 50 which extends in a circumferential direction of the partition member 90. The upper partition member 92 has a through hole 96 in its central portion, and houses in the through hole 96 a movable rubber plate 56 having a constant thickness in its axial cross section and expands over the through hole 96 with no slack. The movable rubber plate 56 has an engaging projection 66 which protrudes axially downwardly from its lower end face along a central axis of the movable rubber plate 56. The movable rubber plate 56 is bonded at its peripheral portion to an inner peripheral portion of an upper open end of the upper partition member 92 in the process of vulcanization of a rubber material for forming the movable rubber plate 56. Accordingly, the through hole 96 is fluid-tightly closed by the movable rubber plate 56, while the movable rubber plate 56 is permitted to displace in its thickness direction due to its elastic deformation. Like the engaging plate 58 in the first embodiment, the lower partition member 94 is also formed at its disk-shaped central portion with an engaging bore 68 extending therethrough along its central axis and a plurality of through holes 64 arranged around the engaging bore 68. The engaging bore 68 allows to extend therethrough the engaging projection 66 integrally formed with the movable rubber plate 56.

The diaphragm 91 is a thin rubber layer of disk shape, and is provided with a slack to facilitate its deformation. The diaphragm 91 is bonded to an metallic fixing ring 98 at its peripheral portion in the process of vulcanization of a rubber material for forming the diaphragm 91. The fixing ring 98 is press-fitted into the axially lower open end portion of the second mounting member 84 while being held in contact with the partition member 90 in its axial direction, whereby outer circumferential surfaces of the partition member 90 and engaging ring 98 are fluid-tightly fixed to an inner surface of the second mounting member 84. The inner surface of the second mounting member 84 is coated by a sealing rubber layer 100 secured thereto over its entire area.

Thus, the second mounting member 84 is fluid-tightly closed at its lower open end portion by the diaphragm 91, to thereby form a fluid chamber filled with a non-compressible fluid and sealed from the external area, in a space between the elastic body 86 and the diaphragm 91 opposing to each other. The movable rubber plate 56 of the partition member 90 supported by the second mounting member 84 divides the fluid chamber into two chambers, i.e., a pressure-receiving chamber 46 located on an axially upper side of the movable rubber plate 56 and an equilibrium chamber 38 located on an axially lower side of the movable rubber plate 56. The pressure-receiving chamber 46 is partially defined by the elastic body 86, while the equilibrium chamber 38 is partially defined by the diaphragm 91. The pressure-receiving chamber 46 and the equilibrium chamber 38 are held in fluid communication with each other via the orifice passage 50 formed in the partition member 90.

The thus constructed engine mount 80 is also equipped with a displacement limiting mechanism on the basis of cooperation of the engaging projection 66 and the lower partition member 94, as in the first embodiment of the present invention. When the engine mount 80 installed in position is subjected to vibrational loads of low or medium frequency range and large or middle amplitude, the movable rubber plate 56 is restricted in its amount of displacement so that the engine mount 80 can exhibit a vibration-damping effect on the basis of resonance or flows of the fluid through the orifice passage 50. When a vibrational load of high frequency range and small amplitude is applied between the first and second mounting members 82, 84, on the other hand, the engine mount 80 is capable of preventing a remarkable increase in its dynamic spring constant owing to displacement of the movable rubber plate 56, thus assuring vibration-damping capability with respect to input vibrations of a high-frequency range.

Figure 6:
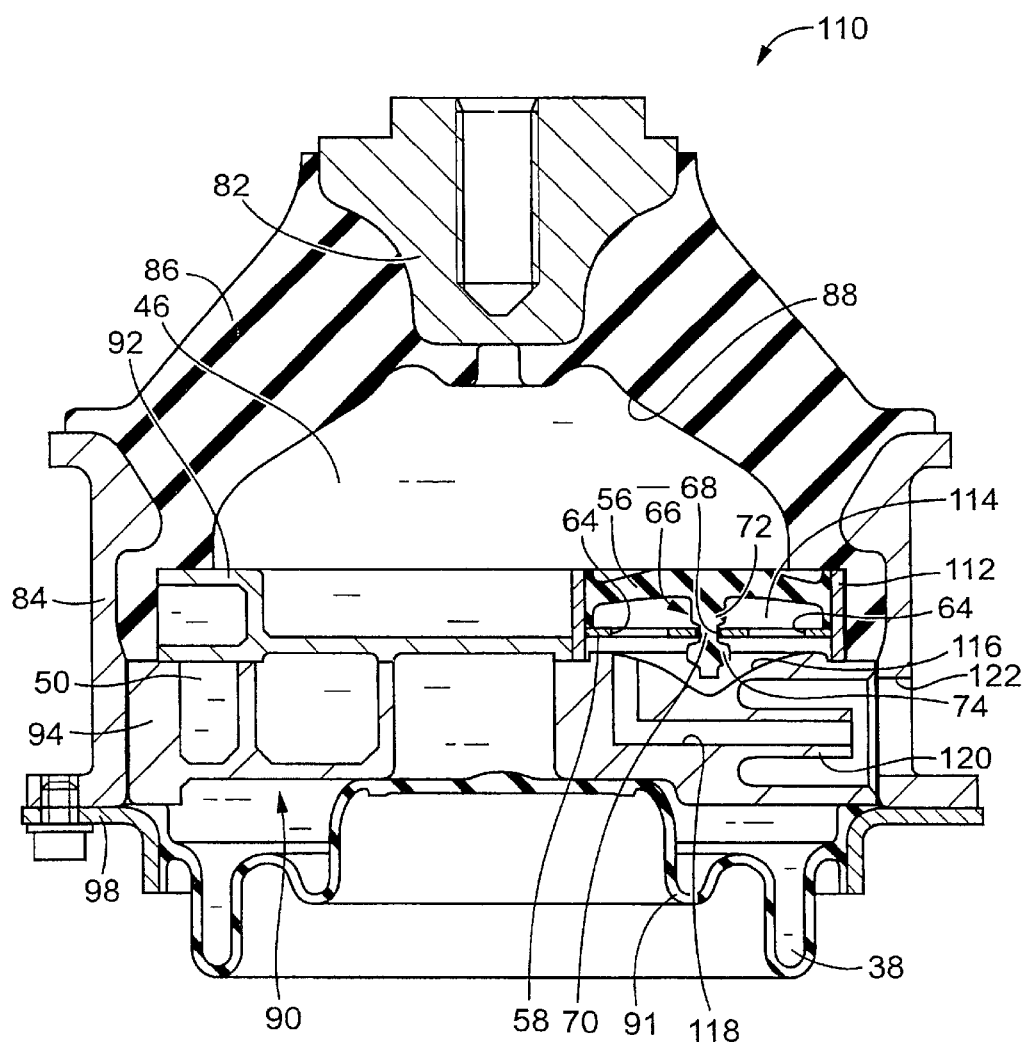
FIG. 6 is an elevational view in axial or vertical cross section of an engine mount constructed according to a third embodiment of the present invention.

FIG. 6 shows an engine mount 110 constructed according to the third embodiment of the present invention. According to the present embodiment, the present invention is applied to a pneumatically operated active vibration damping device equipped with an actuator for generating an oscillating force for exhibiting an active or positive vibration damping effect by way of example. The same reference numerals as used in the engine mount 80 of the second embodiment are used to designate the corresponding elements of the engine mount 10 of the present embodiment, and repetitive description of the elements is omitted.

In the present embodiment, a housing sleeve is bonded to an upper end face of the partition member 90 that is supported by a second mounting member 84 for fluid-tightly separating a pressure-receiving chamber 46 and an equilibrium chamber 38 from each other, so as to protrude into the pressure-receiving chamber 46. The housing sleeve 112 is superposed on the upper end face of the partition member 90 so that an axially lower open end of the housing sleeve 112 is fluid-tightly fixed to and in closely contact with the partition member 90 over its entire circumferential length. That is, the housing sleeve 112 is disposed to protrude axially upwardly into the pressure-receiving chamber 46 with its upper open end open to the pressure-receiving chamber 46.

The housing sleeve 112 houses the movable rubber plate 56 to be disposed in an interior thereof and expands in a radial direction perpendicular to an axis of the housing sleeve 112. The movable rubber plate 56 is bonded at its peripheral portion to an inner surface of an upper open end portion of the housing sleeve 112 in the process of vulcanization of a rubber material for forming the movable rubber plate 56. On the other hand, the partition member 90 has a mortar-shaped recess 116 open in its upper end face at a portion which opposes to the movable rubber plate 56. Thus, the housing sleeve 112, the movable rubber plate 56 and the recess 116 of the partition member 90 cooperate with each other to form a working air chamber 114 between the movable rubber plate 56 and the recess 116. The working air chamber is fluid-tightly sealed from the pressure-receiving chamber 46, the equilibrium chamber 38 and an atmosphere. The housing sleeve 112 further includes the disk-shaped engaging plate 58 disposed axially outward or downward of the movable rubber plate 56 with a given spacing therebetween, and bonded to an inner surface of the housing sleeve 112 at an outer peripheral portion of the engaging plate 58. Like the engaging plate 58 in the first embodiment, the engaging plate 58 in the present embodiment has an engaging bore 68 formed through its central portion so as to extend along its central axis and a plurality of through holes 64 arranged around the engaging bore 68. The movable rubber plate 56 includes an engaging projection 66 extending from its axially lower end face toward the recess 116 through the engaging bore 68.

The partition member 90 has an air passageway 118 extending therethrough and open in the working air chamber 116 at one of opposite ends of the air passageway 118. The partition member 90 includes a sleeve-like connecting port 120 integrally formed at an outer surface thereof so as to protrude radially outwardly. The other opposite end of the air passageway 118 is open in the outer circumferential surface of the partition member 90 through the connecting port 120. The connecting port 120 is connectable to an external air conduit (not shown) through a bore 122 formed through the second mounting member 84.

In the thus engine mount 110, an air pressure variation whose frequency and phase correspond to those of an input variation may be generated by means of an external air generator or source operated under control of a suitable air pressure controller (not shown), and is applied to the working air chamber 114 via the air passageway 118, in order to actively oscillate the movable rubber plate 56 partially defining the working air chamber. Since the pressure-receiving chamber 46 is partially defined by the movable rubber plate 56, a fluid pressure in the pressure-receiving chamber 46 can be actively controlled by controlling an oscillation of the movable rubber plate 56. Therefore, the engine mount 110 can exhibit an active vibration damping device with respect to a vibrational load applied between the first and second mounting members 82, 84, by suitably controlling the fluid pressure in the pressure-receiving chamber 46 depending on a frequency and a phase of an input vibration to be damped. The pneumatic unit provided with a controlling system as described above is well known in the art as one measure for establishing an active damping effect in the vibration-damping device, as disclosed in the JP-A-10-184769, for example. The detail description of the pneumatic unit and a damping theory through the unit is accordingly omitted.

The engine mount 110 of the present embodiment can enjoy the above described advantages of the present invention as well as the engine mount 10 of the first embodiment. Namely, the amount of displacement of the movable rubber plate 56 is restricted in its axial or vertical upward and downward directions as a result of abutting contact or engagement of the engaging projection 66 with the engaging plate 58 in those directions, as in the first embodiment. Therefore, when the engine mount 110 installed in position is subjected to vibrational loads of low or medium frequency range and large or medium amplitude, the amount of displacement of the movable rubber plate 56 is limited so that the engine mount 110 can exhibit a passive vibration-damping effect on the basis of resonance or flows of the fluid flowing the orifice passage 50. On the other hand, when a vibrational load of high frequency range and small amplitude is applied to the engine mount 110, the movable rubber plate 56 is effectively oscillated or displaced owing to an air pressure variation applied to the working air chamber 114 for suitably controlling a fluid pressure in the pressure receiving chamber so that the engine mount 110 can exhibit an excellent vibration-damping effect with the help of the suitably controlled fluid pressure in the pressure-receiving chamber 46.

While the presently preferred embodiments of the invention have been described above in detail for illustrative purpose only, it is to be understood that the invention is not limited to the details of these illustrated embodiments.

For instance, the number or position of engaging projections 66 integrally formed with the movable rubber plate 56 are not particularly limited, but the movable rubber plate 56 may have two or more engaging projections or an engaging projection located on a portion offset from an axis of the movable rubber plate 56. For inserting an engaging portion 74 of the engaging projection 66 into an engaging bore 68 of an engaging plate 58, the engaging portion 74 may have a groove extending in its axial direction for making it easy to reduce a diameter thereof for facilitating insertion of the engaging portion 74 into the engaging bore 68.

A rubber material for forming the movable rubber plate 56, a thickness and an outer diameter of the movable rubber plate 56, and an angle of tapered portion of a large-diameter portion 72 are not particularly limited, but are suitably determined with required vibration-damping characteristics taken into consideration.

In addition, an engaging member disposed axially outward of the movable rubber plate 56 is not necessary needed to be of flat-plate shape, and to have a surface for abutting contact with an outer surface of the movable rubber plate 56, as long as the engaging member is capable of limiting an amount of displacement of the movable rubber plate 56 in a direction toward the pressure-receiving chamber 46 as a result of engagement or abutting contact of an engaging portion formed on the movable rubber plate 56 with the engaging member.

In the illustrated embodiments, the movable rubber plate 56 is disposed so as to be directly exposed to the pressure-receiving chamber 46 whose fluid pressure is directly changed due to the elastic deformation of the elastic body 16. The principle of the present invention is also applicable to a fluid-filled vibration damping device as disclosed in JP-A-10-339350 in which a primary fluid chamber whose fluid pressure varies upon application of a vibrational load to the device is divided into two chambers, i.e., a first pressure-receiving chamber partially defined by the elastic body 16 and a second pressure-receiving chamber partially defined by the movable rubber plate 56, which two chambers are connected to each other via a fluid passage.

While the illustrated embodiments of the fluid-filled vibration damping device of the present invention takes the form of the engine mounts for use in automotive vehicles, by way of example, the principle of the present invention is equally applicable to a body mount or other various types of vibration-damping devices for use in automotive vehicles, and various kinds of vibration damping devices for use in various devices other than the automotive vehicle.

It is also to be understood that the present invention may be embodied with various other changes, modifications and improvements, which may occur to those skilled in the art, without departing from the spirit and scope of the invention defined in the following claims.

What is claimed is:

1. A fluid-filled vibration damping device comprising:
    a first mounting member and a second mounting member, which are disposed in mutually spaced-apart relationship with each other;
    an elastic body elastically connecting said first and second mounting member and partially defining a primary fluid chamber filled with a non-compressible fluid whose pressure varies due to an elastic deformation upon application of a vibrational load between said first and second mounting members;
    a movable rubber plate partially defining said primary fluid chamber such that a peripheral portion of said movable rubber plate is bonded to and fluid-tightly supported by a rigid wall portion of said primary fluid chamber so that fluid pressure variation induced in said primary fluid chamber is regulated or controlled by displacement of said movable rubber plate owing to its elastic deformation, said movable rubber plate having an engaging portion;
    an engaging member fixedly supported by said second mounting member such that said engaging member is disposed on one of, opposite sides of said movable rubber plate with a spacing therebetween to be remote from said primary fluid chamber, and is engaged with said engaging portion of said movable rubber plate so that an amount of displacement of said movable rubber plate is restricted at least in a direction toward an interior of said primary fluid chamber.

2. A fluid-filled vibration damping device according to claim 1, wherein said engaging member includes an engaging bore and said movable rubber plate includes an engaging projection protruding toward and extending outward of said engaging member through said engaging bore of said engaging member with a spacing therebetween, and wherein a distal end portion of said engaging projection protruding outward of said engaging member is formed as a large diameter portion whose diameter is made larger than a diameter of said engaging bore so as to function as said engaging portion such that said large diameter portion of said engaging projection is engaged with a peripheral portion of said engaging bore in order to restrict said amount of displacement of said movable rubber plate in a direction in which said engaging projection is disengaged from said engaging bore of said engaging member.

3. A fluid-filled vibration damping device according to claim 2, wherein a proximal end of said engaging projection is formed as an abutting portion whose diameter is made larger than a diameter of said engaging bore so as to function as said engaging portion such that said abutting portion of said engaging projection is engaged with said peripheral portion of said engaging bore in order to restrict said amount of displacement of said movable rubber plate in a direction in which said engaging projection is inserted into said engaging bore of said engaging member.

4. A fluid-filled vibration damping device according to claim 2, wherein said engaging projection is formed of a rubber elastic body as an integral part of said movable rubber plate.

5. A fluid-filled vibration damping device according to claim 1, wherein at least a part of a portion of said movable rubber plate, which is remote from at least said engaging portion, is located to be opposed to said engaging member with a spacing therebetween, and said movable rubber plate is brought into abutting contact with said engaging member so as to restrict said amount of displacement of said movable rubber plate in a direction away from said interior of said primary fluid chamber.

6. A fluid-filled vibration damping device according to claim 5, wherein said engaging member comprises an abutting plate portion of flat-plate shape, which is disposed to be spaced apart from said movable rubber plate on said one of opposite sides of said movable rubber plate remote from said primary fluid chamber, and which is provided with a plurality of through holes.

7. A fluid-filled vibration damping device according to claim 1, wherein one of opposite major surfaces of said movable rubber plate which is remote from said primary fluid chamber, is exposed to an atmosphere, and said engaging member is disposed in said atmosphere.

8. A fluid-filled vibration damping device according to claim 1, wherein said movable rubber plate is further provided an abutting projection adapted to come into contact with said engaging member to adjust a stroke of displacement thereof.

9. A fluid-filled vibration damping device according to claim 1, further comprising a flexible layer disposed on said one of opposite side of said movable rubber plate which is remote from said primary fluid chamber so as to form an equilibrium chamber filled with said non-compressible fluid and whose volume is variable due to elastic displacement or deformation of said flexible layer, wherein one of opposite major surfaces of said movable rubber plate which is remote from said primary fluid chamber, is exposed to said equilibrium chamber, while an orifice passage is formed for permitting a fluid communication between said primary fluid chamber and said equilibrium chamber.

10. A fluid-filled vibration damping device according to claim 1, wherein said second mounting member is formed to have a generally cup shape in its entirety and is opposed at an open end portion thereof to said first mounting member with a spacing therebetween, and said elastic body is interposed between and elastically connecting said first and second mounting members such that said open end portion of said second mounting member is fluid-tightly closed by said elastic body for forming said primary fluid chamber within said second mounting member, said fluid-filled vibration damping device further comprising: a flexible layer in a form of a thin annular layer disposed outward of said elastic body with a spacing therebetween such that an inner peripheral portion of said flexible layer is bonded to said first mounting member while an outer peripheral portion of said flexible layer is bonded to said open end portion of said second mounting member, for forming an equilibrium chamber partially defined by said flexible layer, filled with said non-compressible fluid and disposed on one of opposite sides of said elastic body which is remote from said primary fluid chamber; and an orifice passage is also formed for permitting a fluid communication between said primary fluid chamber and said equilibrium chamber.

11. A fluid-filled vibration damping device according to claim 1, further comprising a fluid-tightly closed working air chamber disposed on said one of opposite sides of said movable rubber plate which is remote from said primary fluid chamber and partially defined by said movable rubber plate; and an air passageway for permitting an application of air pressure variation from an external area to said working air chamber.

* * * * *